(12) United States Patent
Nakagawa et al.

(10) Patent No.: US 9,194,944 B2
(45) Date of Patent: Nov. 24, 2015

(54) MEASUREMENT DEVICE

(75) Inventors: Tatsuo Nakagawa, Kodaira (JP);
Akihiko Hyodo, Hachioji (JP); Hideaki Kurata, Kokubunji (JP); Shigeru Oho, Soka (JP)

(73) Assignee: Hitachi, Ltd., Tokyo (JP)

( * ) Notice: Subject to any disclaimer, the term of this patent is extended or adjusted under 35 U.S.C. 154(b) by 179 days.

(21) Appl. No.: 13/809,746

(22) PCT Filed: Jul. 14, 2010

(86) PCT No.: PCT/JP2010/061859
§ 371 (c)(1),
(2), (4) Date: Jan. 11, 2013

(87) PCT Pub. No.: WO2012/008021
PCT Pub. Date: Jan. 19, 2012

(65) Prior Publication Data
US 2013/0113644 A1    May 9, 2013

(51) Int. Cl.
*G01S 13/04* (2006.01)
*G01S 13/08* (2006.01)
(Continued)

(52) U.S. Cl.
CPC ............... *G01S 13/08* (2013.01); *G01F 23/284* (2013.01); *G01F 23/2845* (2013.01); *G01S 13/04* (2013.01); *G01S 13/751* (2013.01)

(58) Field of Classification Search
CPC ......... G01S 13/02; G01S 13/04; G01S 13/06; G01S 13/08; G01S 13/74; G01S 13/75; G01S 13/751; G01F 23/22; G01F 23/28; G01F 23/284; G01F 23/2845

USPC ............... 342/5, 6, 21, 22, 27–29, 59, 82, 342/89–103, 147, 156, 159, 175, 188, 342/192–197, 42, 43, 118, 124, 125; 600/300, 309, 310, 407, 430
See application file for complete search history.

(56) References Cited

U.S. PATENT DOCUMENTS 2,917,740 A * 12/1959 Ramsay ............................ 342/6
2,958,863 A * 11/1960 Ramsay ......................... 342/188
(Continued)

FOREIGN PATENT DOCUMENTS

| JP | 7-170304 A | 7/1995 |
|---|---|---|
| JP | 8-226978 A | 9/1996 |

(Continued)

OTHER PUBLICATIONS

M. I. Skolnik, "Introduction to Radar Systems"; second edition; McGraw-Hill Book Company; New York, NY, USA; printed in 1980; pp. 560-561. ISBN 0-07-057909-1.*

(Continued)

*Primary Examiner* — Bernarr Gregory
(74) *Attorney, Agent, or Firm* — Crowell & Moring LLP

(57) ABSTRACT

Disclosed is a measurement device that can accurately measure size, position, the presence of an object, and the like by means of a simple and low-cost method. Specifically, disclosed is a measurement device that is provided with: a transmitter that transmits radio waves; a vibrating surface that vibrates mechanically; a receiver that receives radio waves; and a controller that transmits radio waves from the transmitter, and on the basis of the signal of the radio waves reflected by the vibrating surface and received by the receiver, outputs information about a measured object on the pathway between the transmitter and the receiver with the vibrating surface therebetween.

15 Claims, 16 Drawing Sheets

(51) Int. Cl.
  *G01F 23/284* (2006.01)
  *G01S 13/75* (2006.01)
  *G01S 13/00* (2006.01)
  *G01F 23/00* (2006.01)

(56) References Cited

U.S. PATENT DOCUMENTS

| | | | | |
|---|---|---|---|---|
| 3,295,132 | A | * | 12/1966 | Chapman, Jr. .................... 342/6 |
| 3,660,843 | A | * | 5/1972 | Wolff ................................ 342/6 |
| 4,972,331 | A | * | 11/1990 | Chance ........................ 600/310 |
| 5,073,780 | A | * | 12/1991 | Barley et al. ................. 342/192 |
| 5,315,363 | A | * | 5/1994 | Nettleton et al. .............. 342/29 |
| 5,424,749 | A | * | 6/1995 | Richmond ..................... 342/90 |
| 5,841,392 | A | | 11/1998 | Kishimoto |
| 5,990,822 | A | * | 11/1999 | Honigsbaum .................. 342/90 |
| 6,222,479 | B1 | * | 4/2001 | Honigsbaum .................. 342/90 |
| 6,914,552 | B1 | * | 7/2005 | McEwan ........................ 342/22 |
| 7,405,869 | B1 | * | 7/2008 | Morris et al. ................. 342/100 |

FOREIGN PATENT DOCUMENTS

| | | |
|---|---|---|
| JP | 9-101145 A | 4/1997 |
| JP | 2000-266861 A | 9/2000 |
| JP | 2001-264452 A | 9/2001 |
| JP | 2004-294112 A | 10/2004 |
| JP | 2008-256451 A | 10/2008 |

OTHER PUBLICATIONS

Corresponding International Search Report with English Translation dated Sep. 21, 2010 (five (5) pages).

* cited by examiner

MEASUREMENT DEVICE

TECHNICAL FIELD

The present invention relates to a technology that measures the presence or absence, the position, the size, the liquid volume, the height of the liquid level, or the like of an object with the use of radio waves.

BACKGROUND ART

Devices that detect the presence or absence, the position, or the like of an object with the use of milliwaves and microwaves as detection media have been widely used in various application fields. For example, Doppler radars that use microwaves or milliwaves are used for safe driving or automatic driving of a vehicle. In addition, Doppler sensors utilizing radio waves are used as intruder detection sensors that detect an intruder in a house or the motion of a person in a room. In the production sites or work sites in factories, in order to detect the presence or position of manufactured goods, measurement devices utilizing microwaves are used.

Patent Document 1 discloses an example of such a technology as uses radio waves to measure the presence of an object or the position of an object, in which a transmitter that transmits radio waves and a receiver that receives the radio waves transmitted by the transmitter are installed with a constant distance therebetween, and a transmission sensor that judges whether there is an object between the transmitter and the receiver or not with the use of the radio waves propagating through a space between the transmitter and the receiver is also installed. In addition, Patent Document 2 discloses a technology in which a transmitting device transmits a high-frequency signal in 24.2 GHz band to a predetermined detected area as a pulsing microwave, and a receiving unit detects the signal and detects the presence of a mobile object between the transmitting unit and the receiving unit.

CITATION LIST

Patent Literature

Patent Literature 1: Japanese Unexamined Patent Application Publication No. 2001-264452
Patent Literature 2: Japanese Unexamined Patent Application Publication No. 2004-294112

SUMMARY OF INVENTION

Technical Problem

Detection of the presence or absence of an object or measurement of the position and the size of an object, in which radio waves such as milliwaves and microwaves are utilized, are especially effective in detecting an object that is hidden behind a material that does not let in visible light and infrared light. However, because the wavelengths of milliwaves and microwaves are larger than those of lights, the directivities of these waves are broader than those of lights and the beams of these waves spread widely. Therefore, there is a problem in that, when a device utilizing a milliwave or a microwave detects an object located in a specific position, the device erroneously detects another object located in a different position because the device has a broad detection range.

FIG. 16 shows an example of a conventional measurement device that utilizes a milliwave. This measurement device includes a milliwave transmitter 1600, a milliwave receiver 1601, and antennas 1602 and 1603. A milliwave is output from the milliwave transmitter 1600, and emitted in the air through the antenna 1602. Because there is a difference between the power of the received milliwave in the case where there is an object and the power of the received milliwave in the case where there is no object between the transmitter antenna 1602 and the receiver antenna 1603, the presence or absence of the object can be detected.

However, because radio waves have diffraction characteristics, the beams of radio waves emitted in the air have significant spreads. In addition, because the receiver antenna has a broad directivity, the antenna receives signals sent from a wide range. This makes it difficult that only an object located in a specific position is detected. For example, even when only an object located on a straight line between the transmitter antenna 1602 and the receiver antenna 1603 needs to be detected, the intensity of the received signal is affected by surrounding objects, therefore there is a possibility that an object that is not located on the straight line is detected. In addition, it is difficult to accurately detect the position or size of an object because of a wide spread of the beam of the received milliwave.

In order to prevent the beams of milliwaves from spreading, there are some methods in which the shapes or sizes of antennas and lenses are changed. However, because there are many limitations on the shapes, sizes, materials of antennas used for transmitting or receiving the milliwaves, it is not easy to put effective methods into practice, and additionally, the manufacturing cost and design cost increase.

An object of the present invention is to provide a device that can accurately measure the presence, position, size and the like of an object by means of a low-cost and easy method.

Solution to Problem

Brief description about the outlines of typical inventions among inventions disclosed in this application is as follows. A measurement device disclosed in this application includes: a transmitter that transmits a radio wave; a vibrating surface that vibrates mechanically; a receiver that receives a radio wave; and a controller that transmits a radio wave from the transmitter, and on the basis of the signal of the radio wave reflected by the vibrating surface and received by the receiver, outputs information about a measured object on the pathway between the transmitter and the receiver with the vibrating surface therebetween. In addition, another measurement device disclosed in this application includes: a transmitter that transmits a radio wave; a vibration generator that generates a vibration; a receiver that receives a radio wave that propagates along a pathway via the vibration generator; and a controller that extracts the signal intensity of a frequency component whose frequency is equal to the vibration frequency of the vibration generator from the radio wave received by the receiver.

Advantageous Effects of Invention

The following gives a brief description of the advantageous effects obtained by typical inventions among inventions disclosed in this application. To put it concretely, it becomes possible to extract information only about specific pathways including vibration sources by utilizing the vibration of a vibrating surface or a vibration generator. In addition, since a certain degree of spread of the radio wave becomes tolerable if the size of the vibrating surface is made small, a highly accurate measurement device can be provided easily and at low cost. In addition, since a radio wave is used for detection, it becomes possible to detect an object that is hidden behind a material that does not let in visible light.

DESCRIPTION OF EMBODIMENTS

Embodiments of the present invention will be described in detail with reference to the accompanying drawings.

First Embodiment

Figure 1:
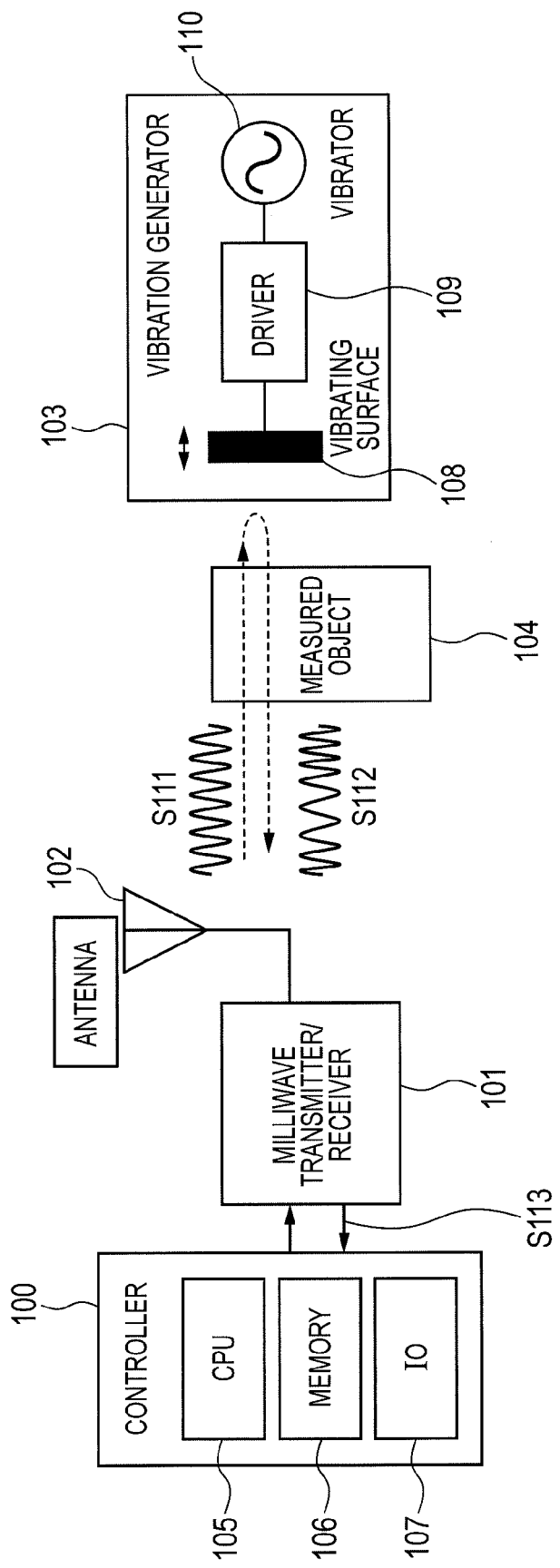
FIG. 1 is a block diagram of a measurement device according to a first embodiment of the present invention.

A measurement device according to a first embodiment of the present invention will be described with reference to FIG. 1 to FIG. 4. FIG. 1 is a block diagram of a measurement device according to a first embodiment of the present invention. This measurement device includes a controller 100, a milliwave transmitter/receiver 101, an antenna 102, a vibration generator 103, and a measured object 104. The controller 100 includes a central processing unit (CPU) 105, a memory 106, and an I/O interface (IO) 107. In addition, the vibration generator 103 includes a vibrating surface 108, a driver 109, and a vibrator 110.

The controller 100 not only controls the operation of the milliwave transmitter/receiver 101, but also performs data processing of output signals (an output signal) sent from the milliwave transmitter/receiver 101. In addition, it is also possible to make the controller 100 control timings to cause the vibration generator 103 to generate a vibration. The milliwave transmitter/receiver 101 outputs a milliwave in the air via the antenna 102. In addition, the milliwave transmitter/receiver 101 receives a millwave sent from the same antenna 102, demodulates the received milliwave, and outputs the data obtained through the demodulation to the controller 100. Here, a milliwave is a radio wave with its wavelength on the millimeter order, and, for example, it is a radio wave with its frequency 77 GHz. However, the radio wave used for this measurement device according to the present invention is not limited to a milliwave. For example, a radio wave other than a milliwave, such as a microwave with its frequency in the 24 GHz band, can be also used for the measurement device according to the present invention. In addition, a radio wave with its frequency between 11 GHz to 300 GHz is desirable for this measurement device.

The vibration generator 103 includes a vibrator 110 that oscillates with a constant cycle, and the vibration generator 103 vibrates the vibrating surface 108 at that frequency. The vibrating surface is driven by the driver 109. The vibrating surface 108 vibrates in the direction that connects the antenna 102 and the vibrating surface 108. The vibrating surface 108 is, for example, a piezoelectric element, a solenoid, or a speaker, but is not limited to the above elements. In addition, the frequency at which the vibrating surface 108 vibrates is, for example, 1 kHz, but is not limited to this frequency. This frequency can be changed. In addition, a frequency between 100 Hz to 100 kHz is desirable for the frequency at which the vibrating surface 108 vibrates.

Figure 2:
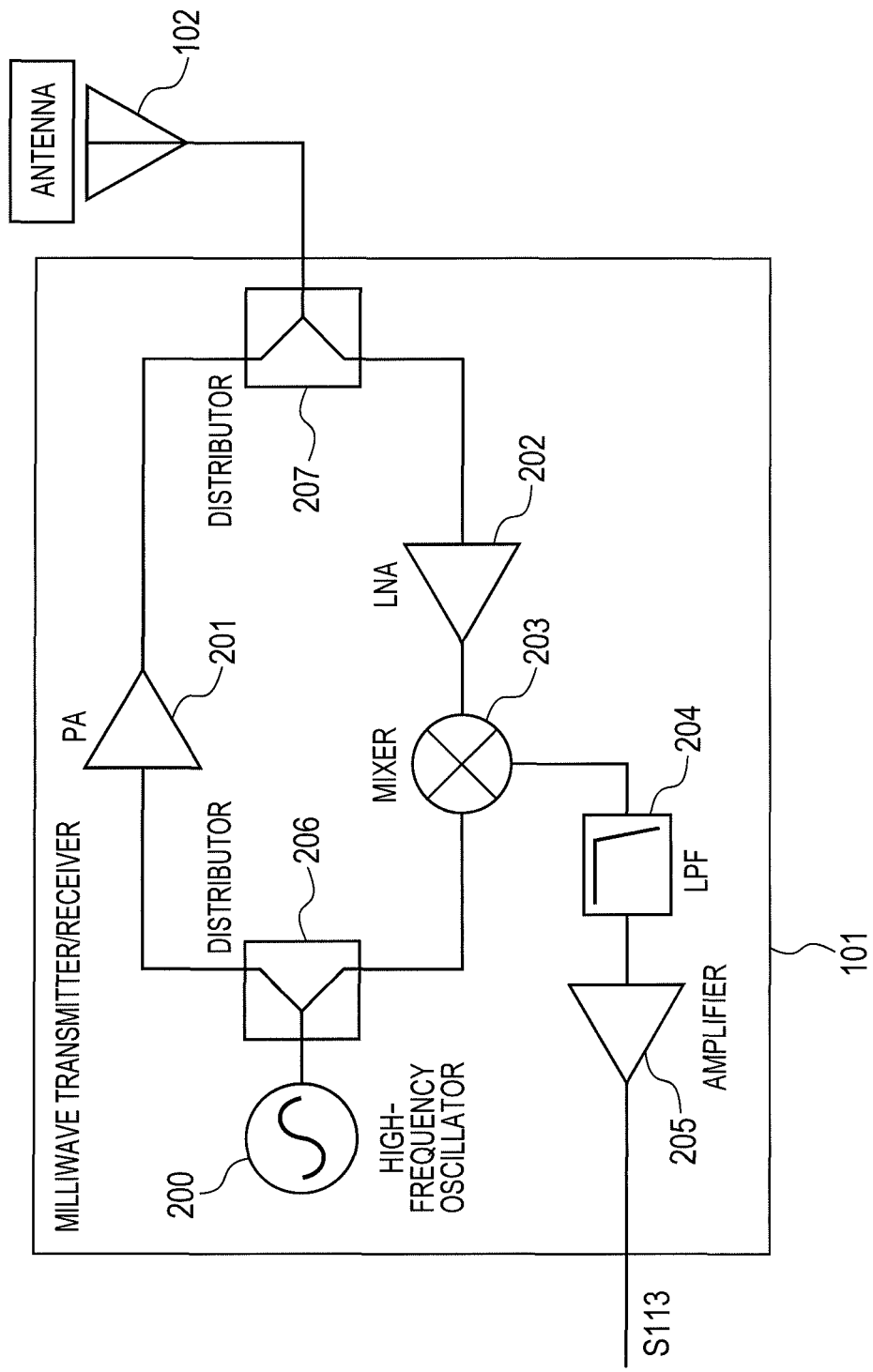
FIG. 2 is a block diagram of a milliwave transmitter/receiver according to the present invention.

FIG. 2 shows an example of the milliwave transmitter/receiver 101 used for the measurement device according to this embodiment. This milliwave transmitter/receiver 101 includes a high-frequency oscillator 200, a transmission power amplifier (PA) 201, a reception low-noise amplifier (LNA) 202 for reception, a mixer 203, a low-pass filter (LPF) 204, an amplifier 205, and distributers 206 and 207. A local oscillator signal with its frequency in a milliwave band generated by the high-frequency oscillator 200 is distributed by the distributor 206, and sent to the antenna 102 via the power amplifier 201 and the distributor 207. In addition, a milliwave received by the antenna 102 passes through the distributor 207, and is amplified by the LNA 202. The signal amplified by the LNA is multiplied by the local oscillator signal sent from the high-frequency oscillator 200 by the mixer 203, and down-converted. The low-frequency signal of the output signal of the mixer 203 is allowed to pass through the LPF 204, amplified by the amplifier 205, and output to the controller 100. As described above, the controller can extract the signal component modulated by the vibration of the vibrating surface through multiplying the modulated milliwave received by the receiver by the outgoing signal that oscillates at the frequency equal to the frequency of the milliwave transmitted by the transmitter.

Figure 3:
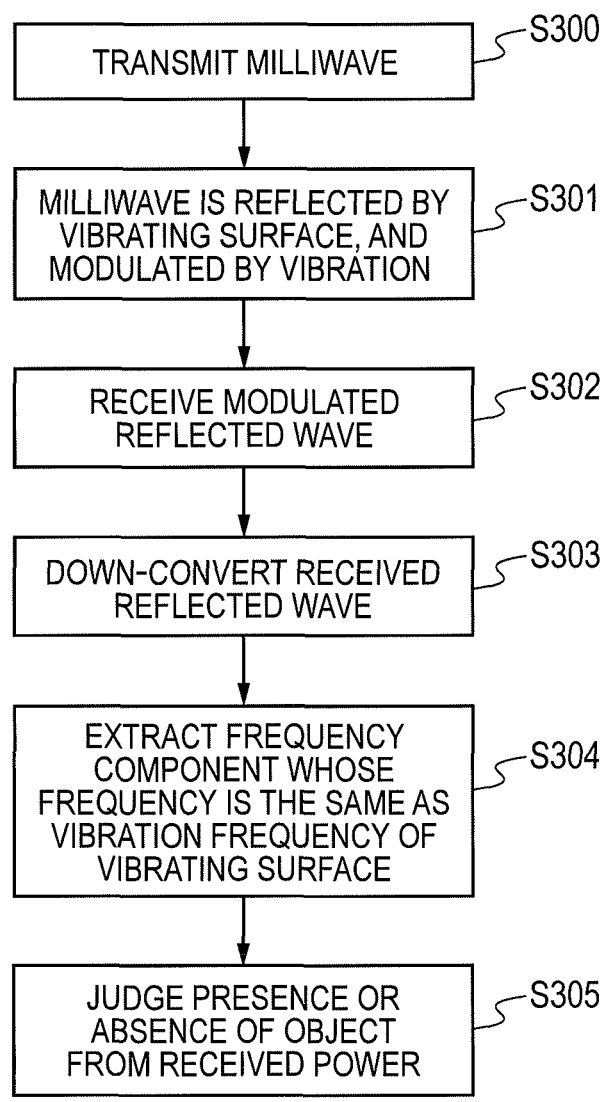
FIG. 3 is an operation flowchart of the measurement device according to the first embodiment of the present invention.

FIG. 3 is a flowchart for explaining the operation of the measurement device according to this embodiment. A milliwave S111 is transmitted from the milliwave transmitter/receiver 101 via the antenna 102 (at step S300). The transmitted milliwave is reflected by the vibrating plate 108 (at step S301). At this time, a milliwave 5112 reflected by the vibrating plate 108 is modulated by the vibration frequency of the vibrating plate 108. To put it concretely, when the milliwave 5111 transmitted from the milliwave transmitter/receiver is represented by Expression 1, the reflected wave 5112 reflected by the vibrating plate 108 is given by Expression 2.

$$V_{TX} = V_{TX0}\sin(2\pi f_m t) \quad \text{[Expression 1]}$$

$$V_{RX} = V_{RX0}\sin\left(2\pi f_m t + \frac{4\pi A f_m}{c}\sin(2\pi f_s t) + \varphi\right) \quad \text{[Expression 2]}$$

Here, $V_{TX0}$, $V_{RX0}$, and A respectively represent the amplitudes of the transmitted wave, the reflected wave, and the amplitude of the vibrating surface. In addition, $f_m$, $f_s$, t, and $\phi$ respectively represent the frequency of the transmitted milliwave, the vibration frequency of the vibrating surface, time, and a phase offset.

The milliwave transmitter/receiver 101 receives the milliwave S112 reflected by the vibrating surface 108 (at step S302). The received millwave S112 is amplified by the LNA 202, and down-converted by the mixer 203. The high-frequency component of the amplified and down-converted milliwave is eliminated by the LPF 204, and the output of the LPF 203 is amplified by the amplifier 205, and transmitted to the controller 100 (at step S303).

Figure 4:
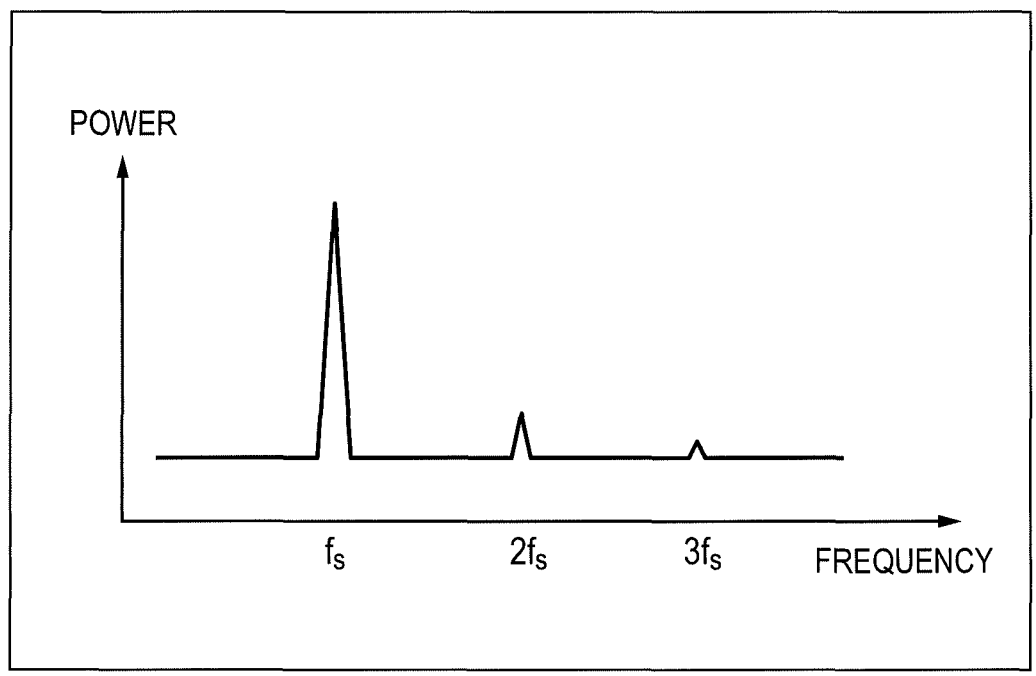
FIG. 4 is an example of the frequency spectra of a signal obtained by the measurement device according to the first embodiment of the present invention.

FIG. 4 is an example of the frequency spectra of the signal S113 that is received and demodulated by the milliwave transmitter/receiver 102. Because the milliwave S112 received by the milliwave transmitter/receiver 102 has been modulated by the vibration frequency of the vibrating surface 108, the output signal 113 of the amplifier 205 becomes a signal including a frequency component whose frequency is equal to the vibration frequency $f_s$ of the vibrating surface 108 and the harmonic frequency components whose frequencies respectively is equal to frequencies $2f_s$, $3f_s$ and so on. The controller 100 extracts a frequency component whose frequency is equal to the vibration frequency $f_s$ of the vibrating surface 108 from the output signal S113 of the milliwave transmitter/receiver (at step S304). This vibration frequency $f_s$ is known, so this information can be stored in the memory 106 in advance. Taking the stored frequency information, or the fact that the vibration frequency $f_s$ becomes peak into consideration, the controller can extract the signal power of the frequency component with the use of the peak of the frequency spectrum.

One of methods in which the controller 100 extracts a frequency component whose frequency is equal to the vibration frequency $f_s$ of the vibrating surface 108 (modulated signal component) from the output signal S113 of the milliwave transmitter/receiver is a method that uses Fast Fourier Transform (FFT). The controller 100 performs FFT processing on the output signal S113 of the milliwave transmitter/receiver, and extracts the signal intensity of the vibration frequency $f_s$ of the vibrating surface 108. Alternatively, there is a method that uses synchronous detection. With the use of an oscillation signal whose frequency is equal to that of the vibrator 110 of the vibration generator 103, the controller 100 performs the synchronous detection on the output signal 113 of the milliwave transmitter/receiver. This makes it possible that the controller 100 extracts a frequency component whose frequency is equal to the vibration frequency $f_s$ of the vibrating surface 108 from the signal S113. In other words, the controller performs the synchronous detection on the component, which is modulated by the vibrating surface 108, of the milliwave received by the receiver with the use of the outgoing signal whose frequency is equal to that of the vibrating surface. The method that uses this synchronous detection makes it possible for a frequency component whose frequency is equal to $f_s$ can be extracted with a less calculation amount than the method that uses the FFT. Therefore, in the case where there is a restriction to the processing speed of the CPU 105 or the capacity of the memory 106, the method that uses the synchronous detection can perform the calculation more effectively with the less calculation amount.

In the case where there is a measured object 104 between the antenna 102 and the vibrating surface 108, because the milliwaves S111 and S112 are attenuated by the measured object 104, the output signal S113 of the milliwave transmitter/receiver 102 becomes smaller than in the case where there is no measured object 104. The controller 100 judges the presence or absence of the object 104 taking the magnitude of the output signal S113 of the milliwave transmitter/receiver 102 into consideration. In other words, the presence or absence of the measured object 104 is judged from the power of the frequency component of the received signal (at step S305). In addition, even in the case a milliwave is reflected by a measured object and does not penetrate the measured object, a similar measurement to the above measurement can be performed. The reason is that both milliwaves S111 and S112 are also attenuated by the measured object to some degree or another in this case. Therefore, the controller 100 can output information about the presence or absence of the measured object. As described above, because the controller outputs the information about the measured object on a pathway between the transmitter and the receiver with the vibrating surface therebetween, the presence or absence of the object can be accurately determined. In addition, if an image display device is installed to the measurement device although this display device is not indispensable, the controller can display this information on the image display device.

While the detection range of an object is determined by the directivity of an antenna in a conventional measurement device, it is possible that the detection range of an object is changed with the use of the vibrating surface in the measurement device according to the present invention. In order to change the detection range, the size and shape of the vibrating surface have only to be changed, and it is not necessary to change the directivity of the antenna. Because the vibrating surface is an piezoelectric element or the like that operates at a low frequency, it is easier to downsize the vibrating surface or change the shape of the vibrating surface into an arbitrary one than to make upon or control an antenna that operates at a high frequency. Therefore, using the vibrating surface as described in this embodiment makes it possible that information only about a specific propagation pathway is obtained, and a detection range is specified. In other words, it becomes possible to narrow a measurement range or to make a specific region a measured range at low cost and easily. In addition, because the frequency of the vibration generator is extracted by the controller, this measurement has an advantage of being resistant to external noises. It is also possible to set the vibration frequency $f_s$ of the vibrating surface 108 to be a frequency other than the frequencies of external noises after measuring the external noises in advance. In addition, if the attenuation factors of some objects at a radio frequency used for the measurement are known, it is possible to judge what kind of object a measured object is with the use of these attenuation factors. In addition, if these attenuation factors are stored in advance in the memory 106, it is also possible for the controller to automatically judge what kind of object a measured object is using these attenuation factors.

In this embodiment, although the description has been made about the milliwave transmitter/receiver that is in an all-in-one structure in which a transmitter and a receiver are integrated, the milliwave transmitter/receiver is not limited to this type. The milliwave transmitter and the milliwave receiver can be prepared separately, and both devices can include antennas respectively. Even in this case, a similar principle makes it possible to measure the presence or absence of an object. In the case where the transmitter and the receiver are integrated in an all-in-one structure, the common high-frequency oscillator can be used; hence, it is possible to simplify the measurement device. In this case, the controller can extract signal component modulated by the vibration through generating the milliwave sent by the transmitter on the basis of the output signal of the high-frequency oscillator, and multiplying the received milliwave by this output signal.

Second Embodiment

With the use of the principle applied to the measurement device according to the present invention, not only the presence or absence of an object but also the size of the object or the amount of a material can be measured. For example, the amount of a liquid contained in a container can be also measured.

Figure 5:
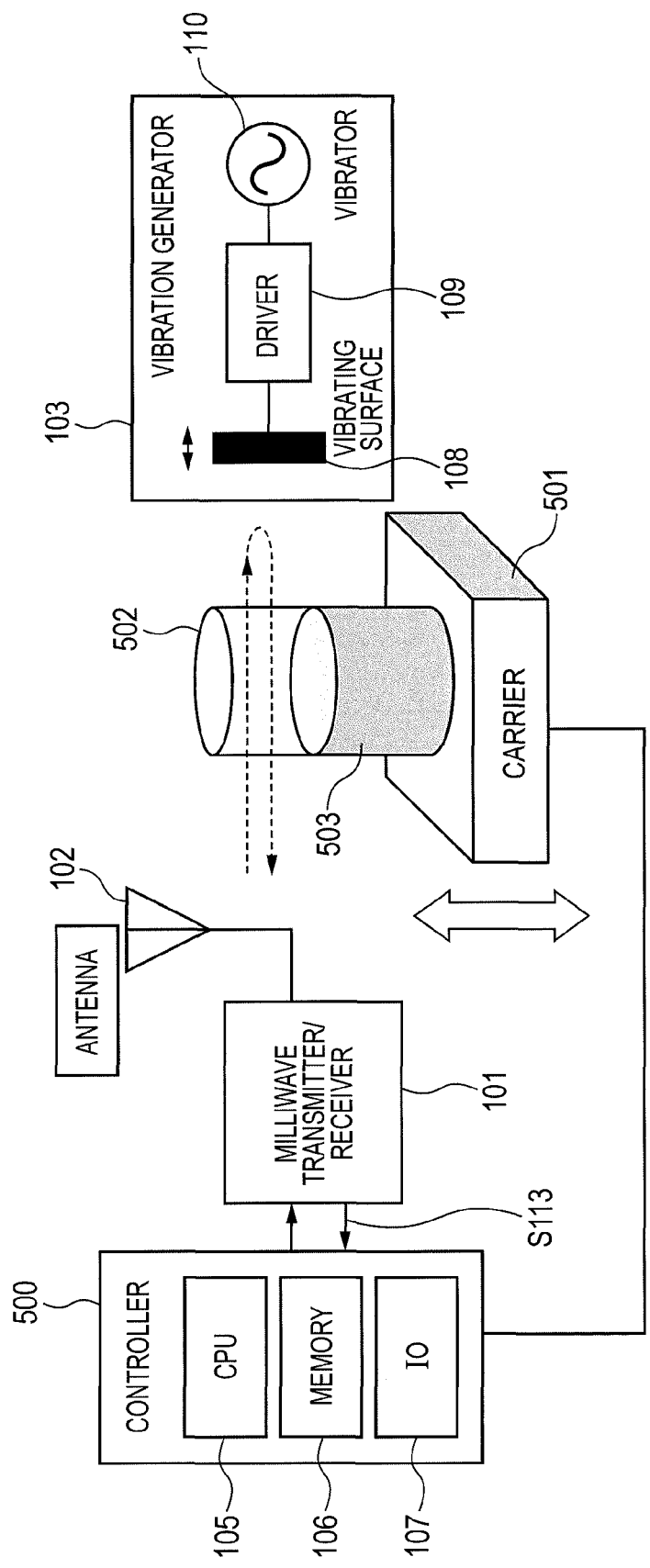
FIG. 5 is a block diagram of a measurement device for measuring the height of the liquid level of a liquid according to a second embodiment of the present invention.

A measurement device for measuring the height of the liquid level of a liquid according to a second embodiment of the present invention will be described with reference to FIG. 5 to FIG. 7. The measurement device according to this embodiment is used for measuring the height of the liquid level or the liquid volume of a liquid contained in a container. FIG. 5 is a block diagram of the measurement device for measuring the height of the liquid level of a liquid according to this embodiment. The measurement device includes a controller 500, a milliwave transmitter/receiver 101, an antenna 102, a vibration generator 110, a carrier 501, a container 502, and a liquid 503.

The controller 500 not only controls the milliwave transmitter/receiver 101 and performs data processing of a signal S113 sent from the milliwave transmitter/receiver 101, but also controls the carrier 501. In addition, it is also possible to make the controller 100 control timings to cause the vibration generator 103 to generate a vibration. The milliwave transmitter/receiver 101 transmits or receives a milliwave on the basis of instructions sent from the controller 500 via the antenna 102, and demodulates the received signal. The carrier 501 moves the container 502 containing the liquid 503, which is a measured object, in the vertical direction on the basis of a control signal sent from the controller 500. Here, because the container is moved in order to change the position of the container 502 relative to the positions of the antenna 102 and the vibrating surface 108, moving the antenna 102 and the vibrating surface 108 instead of moving the container 502 brings about the same effect. In addition, if the measured object is not a liquid, the propagation pathway can be moved in the direction perpendicular to the page. In any way, it is all right if the positional relation between the propagation pathway of the milliwave and the measured object can be changed relatively in the perpendicular direction.

Figure 6:
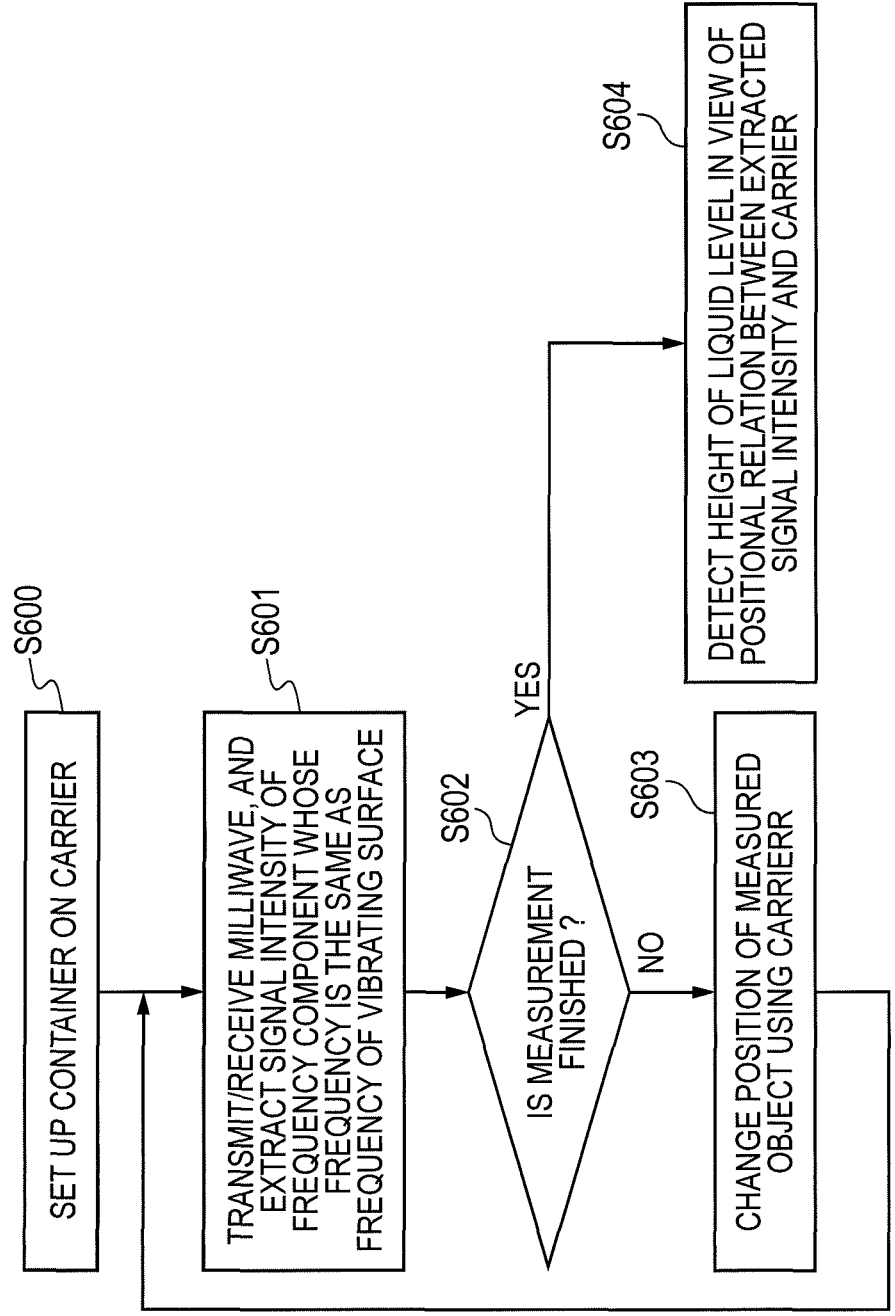
FIG. 6 is an operation flowchart of the measurement device for measuring the height of the liquid level according to the second embodiment of the present invention.

FIG. 6 shows an operation flowchart of this measurement device. First, the container 502 containing the liquid 503, which is a measured object, is set up on the carrier 501 (at step S600). Next, the milliwave transmitter/receiver 101 transmits a milliwave, and the milliwave transmitter/receiver 101 receives a signal reflected by the vibrating surface 108. The signal is down-converted, and the controller 500 extracts the signal intensity of a frequency component whose frequency is equal to the vibration frequency of the vibrating surface (at step S601). Subsequently, the controller 500 controls the carrier 501 so as to change the position of the container 502 (at step S603). The above processes are repeated until the measurement is finished (at steps S601, S602, and S603). When it comes to a way to move the carrier, there is two ways: one is a way in which the signal intensity can be extracted while the carrier is being moved continuously, and the other way is a way in which the signal intensity can be extracted while the carrier remains still after being moved intermittently.

Figure 7:
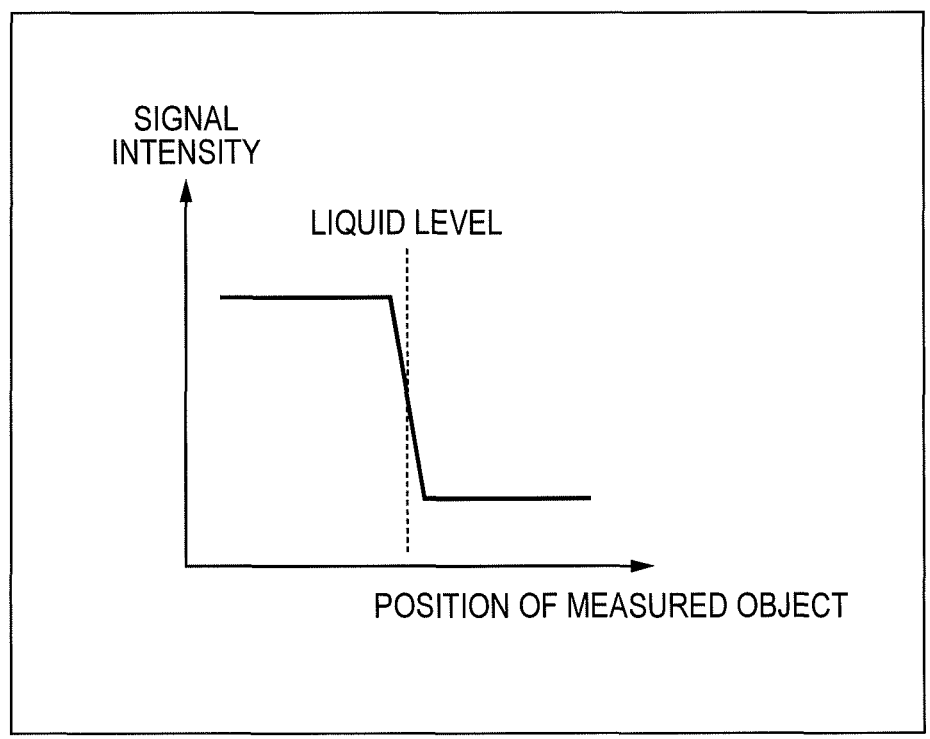
FIG. 7 is an example of a profile of a signal intensity obtained by the measurement device for measuring the height of the liquid level according to the second embodiment of the present invention.

FIG. 7 is an example of an output signal obtained when this device is used for measurement. Because the milliwave is attenuated by a liquid, there is a difference between the intensity of a signal received by a portion of the container 502 that does not contain the liquid 503 and the intensity of a signal received by a portion of the container 502 that contains the liquid 503. Therefore, the intensities of the received signals change at the position of the liquid level as a boundary. The controller 500 can detect the height of the liquid level by detecting this boundary. In other words, the controller 500 can detect the height of the liquid level in view of the positional relation between the extracted signal intensity and the carrier (at step S604). In addition, with the use of the signal intensity distributions obtained through measuring liquids whose heights of liquid levels are known in advance and the signal intensity distribution of a liquid whose height of the liquid level is unknown, the height of the liquid level of the liquid whose height of the liquid level is unknown can be obtained by comparing the heights of the liquid levels corresponding to the distributions with each other. In addition, if the cross-section area and shape of the container 502 is known, the liquid volume can be calculated from the height of the liquid level. As a result, the controller 100 outputs information about the position, the size, the height of the liquid level, the liquid volume, etc. of a measured object. As described above, the controller outputs information about a measured object on the pathway between the transmitter and the receiver with the vibrating surface therebetween, which enables the position, the size, the liquid volume, the height of the liquid level of the object to be accurately detected. In addition, if an image display device is installed to the measurement device although this display device is not indispensable, the controller can display this information on the image display device.

In addition, there is a possibility that the milliwave sent from the milliwave transmitter/receiver 101 is diffracted by the container 502, reflected by the vibrating surface 108, and received by the milliwave transmitter/receiver 101, hence the detection accuracy of the height of the liquid level of a liquid being deteriorated. One of the effective means to reduce this adverse effect is making the distance between the container 503 and the vibrating surface 108 as short as possible. For example, it becomes possible to suppress the adverse effect brought about by the diffraction by making the distance between a measured object and the vibrating surface 508 shorter than the wavelength of the used milliwave.

Because it is possible that information only about a specific propagation pathway is obtained by using the measurement method in which a milliwave transmitter/receiver and a vibrating surface are used in combination as described in this embodiment, the height of the liquid level of a liquid can be accurately measured. In addition, because a radio wave such as a milliwave wave is used for detection, it becomes possible to measure the height of the liquid level of a liquid that is contained in a nontransparent colored container or in a container to which a paper label is pasted. A liquid that can be measured by the measurement device according to this embodiment can be any liquid as long as a radio wave used for the measurement is attenuated when the radio wave passes through the liquid. It is, for example, water, oil, chemical liquid, blood, or the like. In addition, in the case where the kind of a liquid that is a measured object is unknown, it becomes possible to specify the kind of the liquid with the use of the measured attenuation factor. In addition, if attenuation factors are stored in advance in the memory 106, it is also possible for the controller to automatically judge what kind of liquid the measured object is using these attenuation factors.

In this embodiment, the description has been made about a liquid contained in a container, but a measured object measured in this embodiment is not limited to a liquid contained in a container. For example, the height or size of an object contained in a cardboard box can be also measured. In addition, plural kinds of liquids or objects can be detected in a single measurement. For example, in the case where a measured object is composed of several kinds of objects in a layered form, if the attenuation factors of a radio wave for the objects are different from each other, the positions of the boundary surfaces among the objects can be measured. In addition, for example, in the case where a measured object is composed of plural kinds of liquids in a multi-layered form, if the attenuation factors of a radio wave for the liquids are different from each other, the positions of the boundary surfaces among the liquids can be measured.

Third Embodiment

Figure 8:
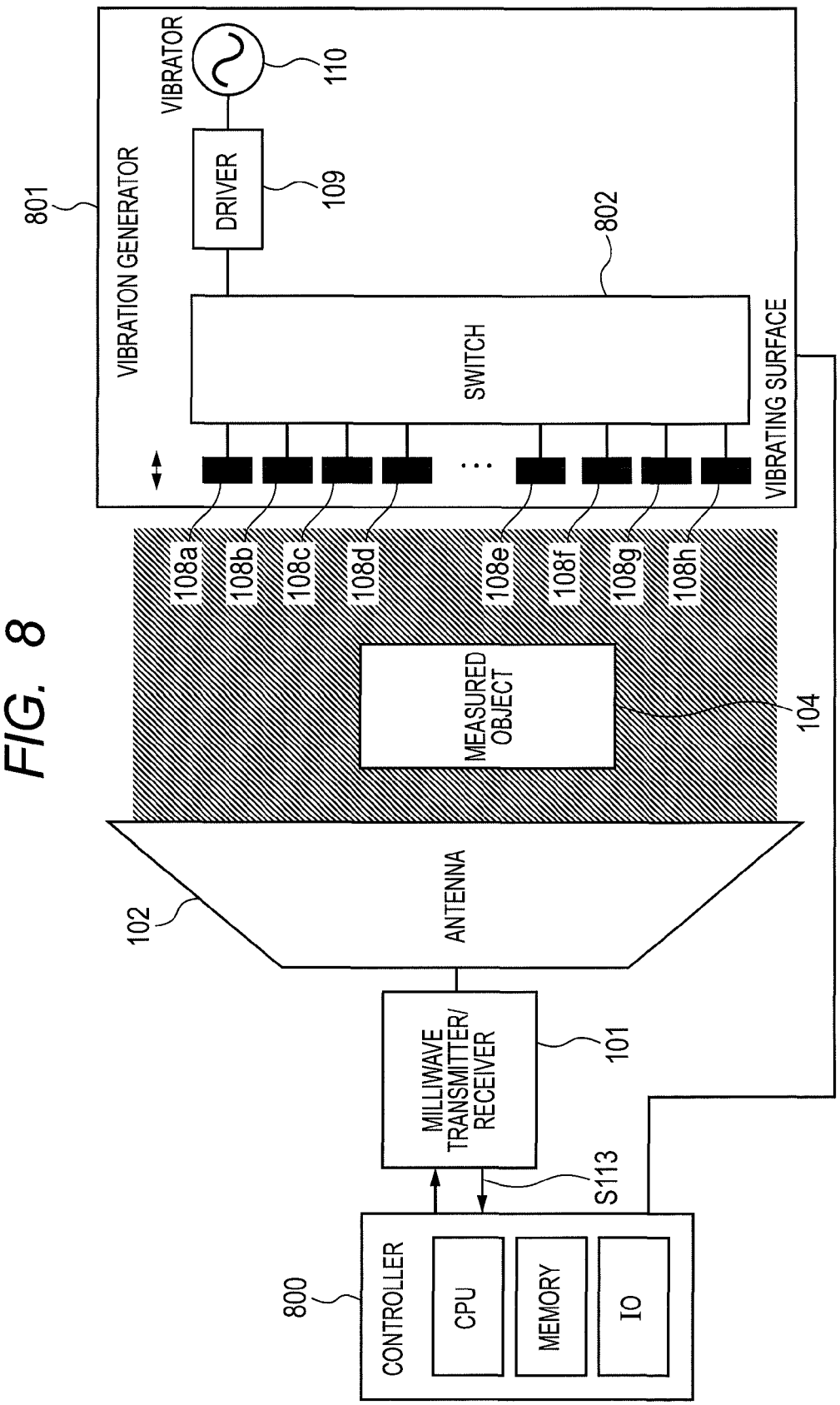
FIG. 8 is a block diagram of a measurement device for measuring the position and the size of an object according to a third embodiment of the present invention.

A measurement device according to a third embodiment of the present invention will be described with reference to FIG. 8 to FIG. 10. This device is a device suitable for measuring the size and position of a measured object without moving the measured object. FIG. 8 is a block diagram of the measurement device according to this embodiment. This measurement device includes a controller 800, a milliwave transmitter/receiver 101, an antenna 102, a vibration generator 801, and a measured object 104. The vibration generator 801 includes a vibrator 110, a driver 109, a switch 802, and plural vibrating surfaces (vibration sources) 108a, 108b, 108c, etc. Here, subscripts a, b, c, and the like means that 108a, 108b, 108c, etc. are the same components, and hereinafter these subscripts will be omitted when they are not indispensable.

The controller 800 not only controls the milliwave transmitter/receiver 101 and performs processing of received data, but also controls the vibration generator 801. The vibration generator 801 receives a control signal from the controller 800, and trips the switch 802 to select and vibrate any one of the vibrating surfaces 108a, 108b, 108c, and so on.

Figure 9:
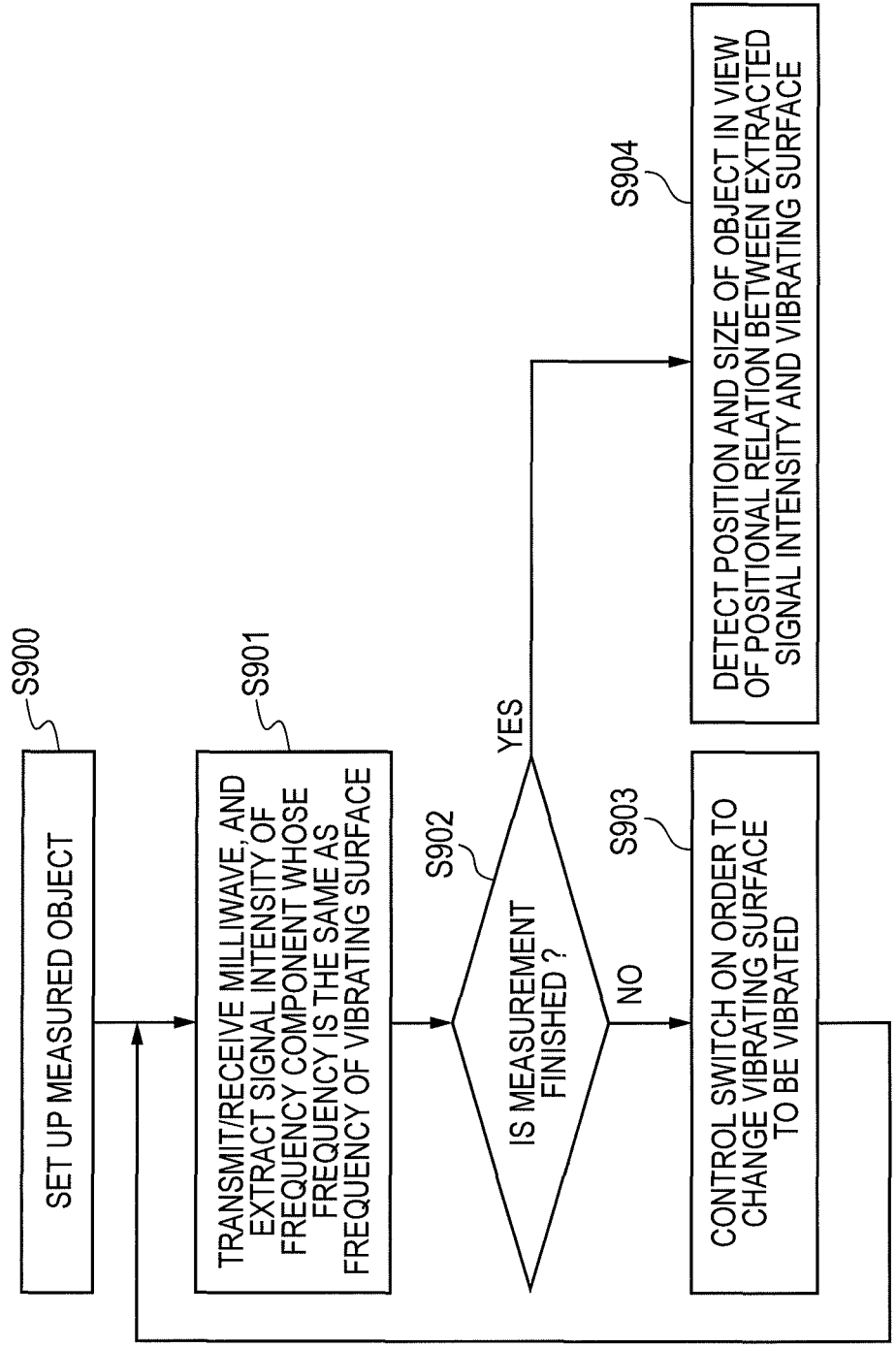
FIG. 9 is an operation flowchart of the measurement device according to the third embodiment of the present invention.

FIG. 9 is a flowchart showing an operation of the measurement device according to this embodiment. First, a measured object 104 is set up on the measurement device according to this embodiment (at step S900). Next, under the situation that a certain vibrating surface, for example, the vibrating surface 108a is being vibrated, the milliwave transmitter/receiver 101 transmits and receives a millwave, and extracts signal intensity whose frequency is equal to the vibration frequency of the vibrating surface 108a (at step S901). Next, the controller 800 controls the switch 802 so that another vibrating surface to be vibrated, for example, the vibrating surface 108b is selected (at step S903). This process is performed on all the vibrating surfaces 108 (at steps S901, S902, and S903).

Figure 10:
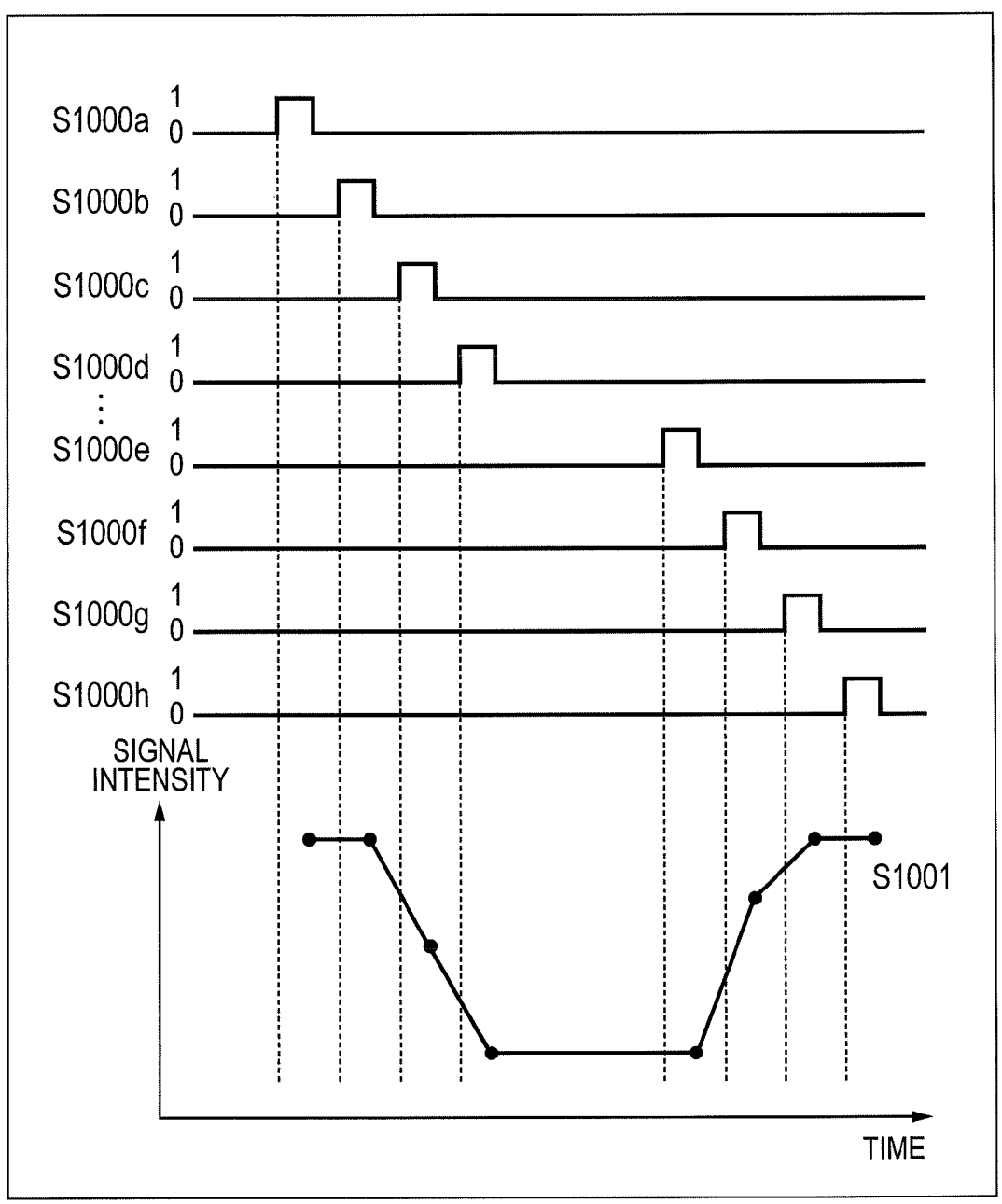
FIG. 10 is an example of a profile of a signal intensity obtained by the measurement device according to the third embodiment of the present invention.

An example of a profile of the signal intensities obtained by the above operation of the measurement device is shown in FIG. 10. Signals S1000a, S1000b, S1000c, etc. respectively show the operating states of the vibrating surfaces 108a, 108b, 108c, etc. The signal S1000 being "1" means that the vibrating surface 108 is being vibrated, and the signal S1000 being "0" means that the vibrating surface 108 is not being vibrated. An output signal S113 sent from the transmitter/receiver 101 to the controller 800 varies depending on whether there is the measured object 104 between the antenna 102 and the vibrating surfaces 108a, 108b, 108c, or the like or not. In other words, a profile S1001 showing that the milliwave attenuates depending on the presence or absence of the measured object 104 can be obtained. In the case of S1000d or S1000f where part of the measured object is located in front of the corresponding vibrating surface, a signal intensity between a high signal intensity and a low signal intensity is obtained. Taking the positional relation between this profile S1001 of the signal intensities and the vibrating surfaces 108 into consideration, the position, size, the end face, or the like of the measured object 104 is detected by the controller 800 (at step S904).

In this embodiment, information about the size or position of a measured object can be obtained by switching the vibrating surfaces to be vibrated with the use of the switch without moving the measured object. This embodiment is helpful in the case where information about the position or size of an object contained in a nontransparent case such as a cardboard box is obtained. In other words, a noncontact detection can be achieved without emptying the case. In addition, as is the case with the second embodiment, the height of the liquid level or the liquid volume of a liquid can be also measured in this embodiment.

In addition, by increasing the number of vibrating surfaces, an object located in a broader range can be detected. In the case where an object located in a broad range is measured, the beam of a millwave has to be spread so as to cover all the vibrating surfaces 108. In this case, it is conceivable that the intensity of the milliwave that is reflected by the vibrating surface 108 and received again by the antenna 102 varies depending on the location of the vibrating surface 108 to be vibrated owing to the directivity of the antenna 102. To cope with such a case, a technique in which a power profile S1001 in the case where there is no measured object is obtained in advance, and the position or size of a measured object is obtained taking into consideration the relative change between the power profile obtained in advance and a profile obtained in the case where there is the measured object.

In addition, by downsizing the vibrating surfaces and disposing the vibrating surfaces in a very dense state, a more accurate position or size measurement can be achieved. Therefore, through working upon the vibrating surfaces that operate at a low frequency easily and at low cost instead of working upon the milliwave antenna that has many limitations, a highly accurate measurement can be achieved. In addition, through electrically tripping the switch instead of physically moving a measured object, the pathway of the measurement can be changed; therefore a high-speed measurement can be performed. In addition, in view of power consumption, tripping the switch consumes less power than moving an object. Alternatively, a combination of moving an object and selecting a vibrating surface to be vibrated by tripping the switch can be also adopted. In this case, a short moving distance makes it possible to measure an object located in a wide range.

In addition, in this embodiment, although an example of the disposition of the vibrating surfaces is a one-dimensional disposition, the disposition of the vibrating surfaces is not limited to a one-dimensional disposition. For example, through disposing the vibrating surfaces two-dimensionally, it becomes possible to measure the position, area, or shape of an object in a two-dimensional space can be measured.

In this embodiment, the vibrating surfaces are vibrated one-by-one sequentially by way of illustration, the vibrating surfaces can be vibrated two by two, or the vibrating surfaces can be vibrated alternately depending on how accurately a measured object has to be measured. In addition, it is not always necessary to vibrate all the vibrating surfaces. Because there may be various ways to operate the measurement device depending on accuracy or a detection time needed for the measurement, or depending on the rough size of a measured object, or the like, it is conceivable that information about various ways to operate the measurement device is stored in a memory in advance, which allows a user to freely select one of the various ways to operate the measurement device.

Fourth Embodiment

Figure 11:
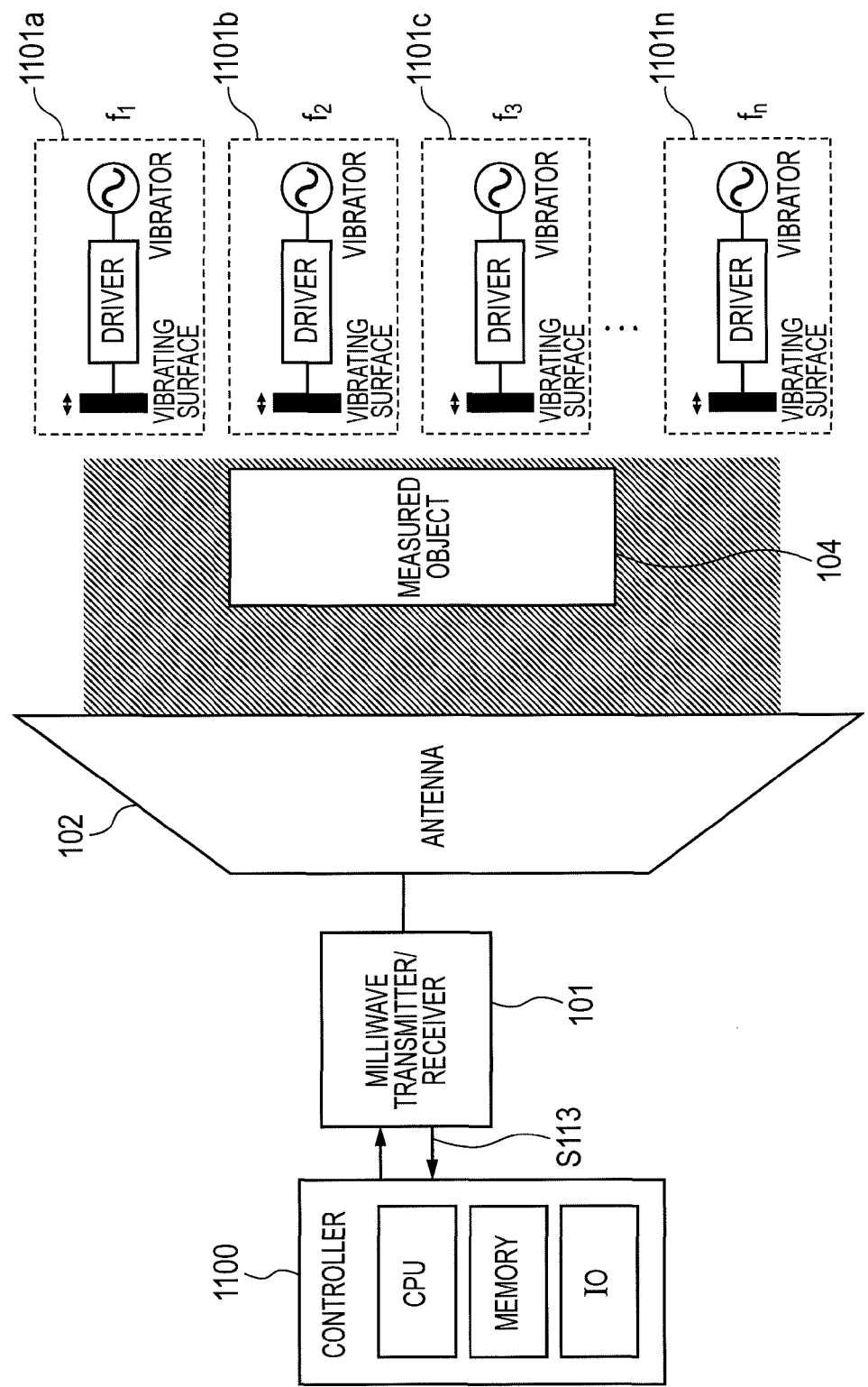
FIG. 11 is a block diagram of a measurement device for measuring the position and the size of an object according to a fourth embodiment of the present invention.
Figure 12:
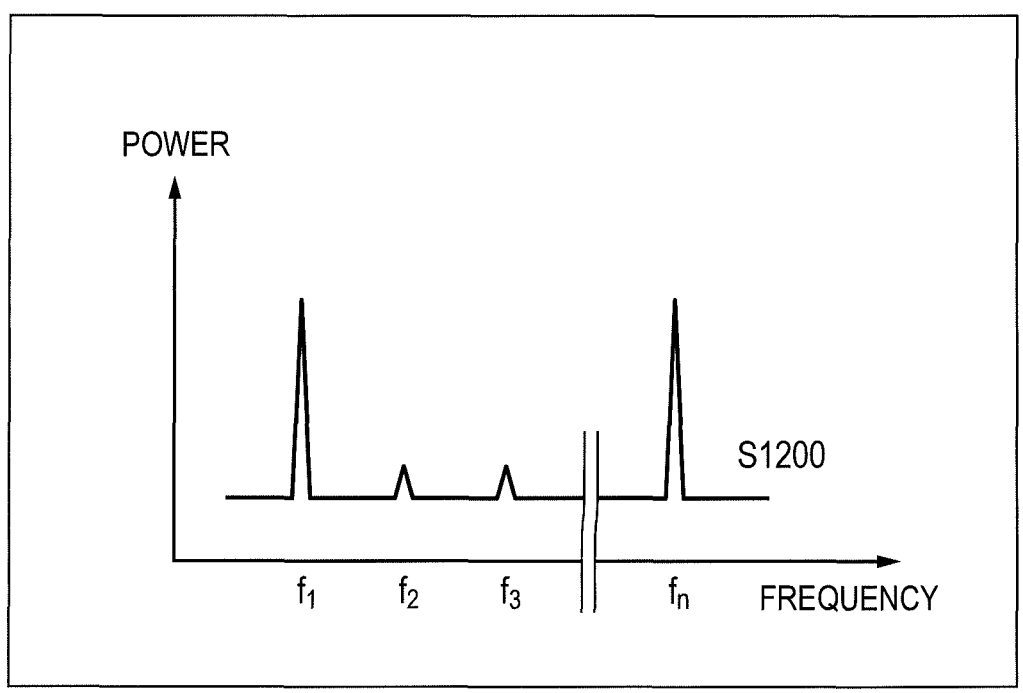
FIG. 12 is an example of the frequency spectra of a signal obtained by the measurement device according to the fourth embodiment of the present invention.

A measurement device according to a fourth embodiment of the present invention will be described with reference to FIG. 11 and FIG. 12. The measurement device according to this embodiment has not only the advantageous effects that are the same as those of the third embodiment, but also can reduce a time needed for the measurement. FIG. 11 is a block diagram of the measurement device according to this embodiment. This measurement device includes a controller 1100, a milliwave transmitter/receiver 101, an antenna 102, plural vibration generators 1101a, 1101b, 1101c, etc, and a measured object 104. The vibration generators 1101a, 1101b, 1101c, etc respectively generate frequencies different from each other, and vibrating surfaces (vibration sources) 108 are respectively vibrated at frequencies f1, f2, f3, . . . , fn.

Milliwaves are transmitted by the milliwave transmitter/receiver 101 via the antenna 102. The transmitted milliwaves are reflected by the vibrating surfaces 108 respectively included by the vibration generators 1101a, 1101b, 1101c, etc. and modulated. The milliwave transmitter/receiver 101 receives the reflected and modulated milliwaves. The received milliwaves are amplified, multiplied by a local oscillation signal by a mixer, pass through an LPF, and down-converted. The down-converted signals are amplified and output to the controller 1100. The output signal S113 is data-processed by the controller 1100. In addition, the controller 1100 controls the milliwave transmitter/receiver 101.

The signal S113 output from the milliwave transmitter/receiver 101 has the frequency components of vibration frequencies f1, f2, f3, . . . , fn respectively corresponding to the vibration generators 1101a, 1101b, 1101c, and so on. FIG. 12 shows an example of a frequency spectrum diagram of the output signal S113 output from the milliwave transmitter/receiver 101. The spectra of the output signal S113 output from the milliwave transmitter/receiver 101 vary depending on a pathway between the milliwave transmitter/receiver 101 and the vibration generators 1101. In other words, if there is a measured object 104 between a vibration generator 1101 and the milliwave transmitter/receiver 101, the milliwaves are attenuated, and if there is no measured object 104, the milliwaves are received without being attenuated. Therefore, it becomes possible to measure the presence or absence of the measured object 104 on the pathways by taking into consideration the intensities, which are included by the output signal S113 of the milliwave transmitter/receiver 101 and corresponding to the operating frequencies of the vibrating surfaces 108, and the size or position of the measured object 104 can be detected with the use of the positions of the vibration generators 1101. For example, FIG. 12 shows that there is an object in front of both vibration generators corresponding to $f_2$ and $f_3$.

It is necessary for the signals sent from the milliwave transmitter/receiver 101 to have diffusive property so that the signals reach all the vibration generators 1101. Alternatively, it is conceivable that a phased-array antenna is used or an antenna is moved mechanically so that the milliwaves can reach all the vibration generators. It is expected that the intensities of the milliwaves that are reflected by the vibrating surfaces 108 and received by the antenna 102 again are respectively influenced by the directivity of the antenna 102. To cope with such a case, a technique in which power spectra S1200 in the case where there is no measured object are obtained in advance, and the position or size of a measured object is obtained taking into consideration the relative change between the above power spectra and power spectra obtained in the case where there is the measured object.

In this embodiment, as described above, by using plural vibrating surfaces that have vibration frequencies different from each other, it becomes possible to obtain information about plural pathways at the same time. As a result, the position or size of a measured object, or the position of the end face of the measured object can be measured in a shorter time. In addition, as is the case with the second embodiment, the height of the liquid level or the liquid volume of a liquid can be also measured in this embodiment. In addition, as is the case with the fourth embodiment, it is not always necessary to vibrate all the vibrating surfaces. Because there may be various ways to operate the measurement device depending on accuracy needed for the measurement, or depending on the rough size of a measured object, or the like, it is conceivable that information about various ways to operate the measurement device is stored in a memory in advance, which allows a user to freely select one of the various ways to operate the measurement device.

Fifth Embodiment

Figure 13:
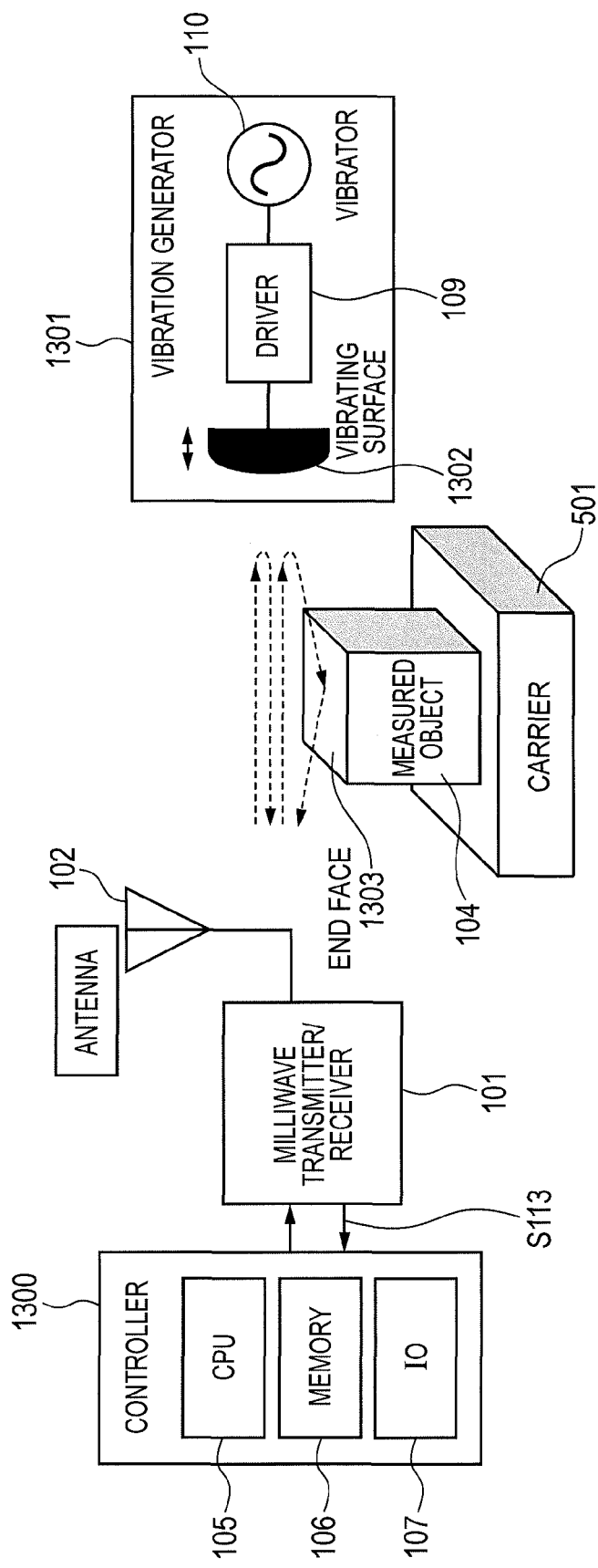
FIG. 13 is a block diagram of a measurement device for measuring the height of an object according to a fifth embodiment of the present invention.

A fifth embodiment of the present invention will be described with reference to FIG. 13 and FIG. 14. FIG. 13 shows a measurement device according to the fifth embodiment of the present invention. This measurement device includes a controller 1300, a milliwave transmitter/receiver 101, a vibration generator 1301, and a measured object 104.

The feature of this measurement device is that a milliwave that reflected by the end face 1303 of the measured object 104 is utilized. In other words, not only a first pathway in which a milliwave transmitted from the milliwave transmitter/receiver 101 is reflected by a vibrating surface 1302 and returned to the milliwave transmitter/receiver 101, but also a second pathway in which a milliwave transmitted from the milliwave transmitter/receiver 101 is reflected by a vibrating surface 1302 and by the end face 1303 of the measured object 104 and returned to the milliwave transmitter/receiver 101 is utilized. In the case where the end face 1302 of the measured object 104 is located nearly on the straight line that connects the antenna 102 and the vibrating surface 1302, the length of the first pathway and the length of the second pathway are almost equal to each other. In addition, because the number of reflections a milliwave experiences when transmitted through the first pathway and that a milliwave experiences when transmitted through the second pathway are different from each other, the phases of both milliwaves are opposite to each other. Therefore, the propagation length of a signal transmitted through the first pathway and that of a signal transmitted through the second pathway is nearly equal, and the phases of both signals are opposite to each other, hence both signals interfere with each other, and cancel each other. Here, the reflections by the vibrating surface 108 and by the end face 1303 of the measured object 104 can be made either in this order or in the reverse order.

Figure 14:
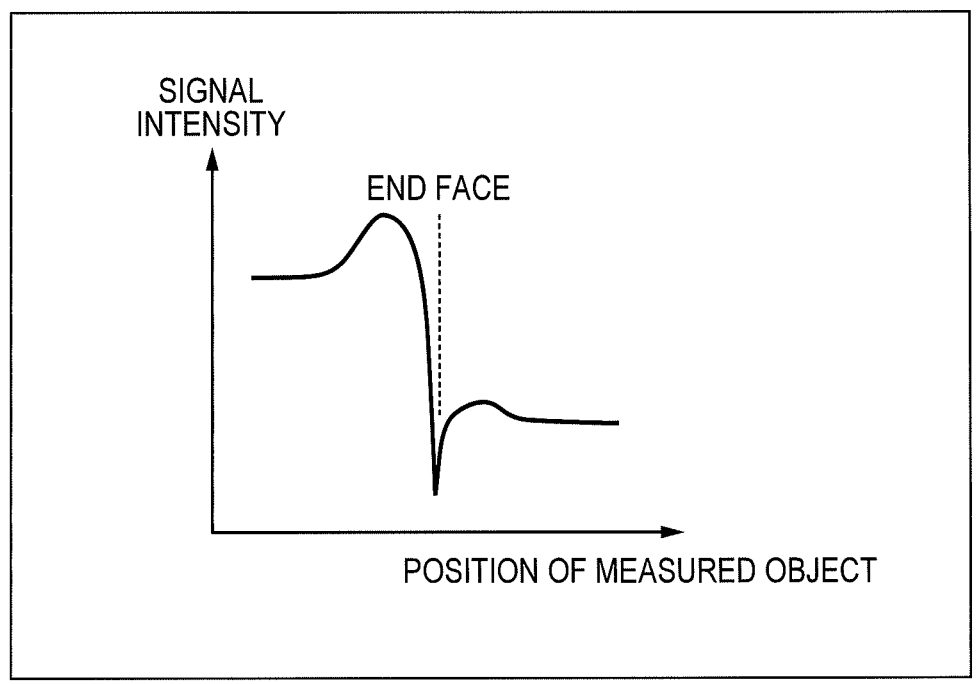
FIG. 14 is an example of a profile of a signal intensity obtained by the measurement device for measuring the height of an object according to the fifth embodiment of the present invention.

FIG. 14 shows an example of an output from the milliwave transmitter/receiver 101 to the controller 1300, wherein the output is obtained while a measured object 104 is being moved by use of a carrier 501. FIG. 14 shows the signal intensity of the output signal S113 of the milliwave transmitter/receiver 101 versus the position of the measured object 104. Because the signal on the first pathway and the signal on the second pathway cancel each other in the vicinity of the end face 1303 of the measured object 104, the intensity of the signal S113 becomes weakened.

As described above, by utilizing the interference between a milliwave that is reflected by the end face of a measured object and a milliwave that is not reflected by the end face of the measured object, the position of the end face of the measured object can be accurately measured.

One of methods to create a pathway on which a milliwave is reflected by the end face of a measured object is, for example, to make the vibrating surface a curved surface. Alternatively, it is conceivable that the directivity of a milliwave beam, that is, the spread of the milliwave is utilized so that the milliwave is reflected by the end face of the measured object.

Sixth Embodiment

Figure 15:
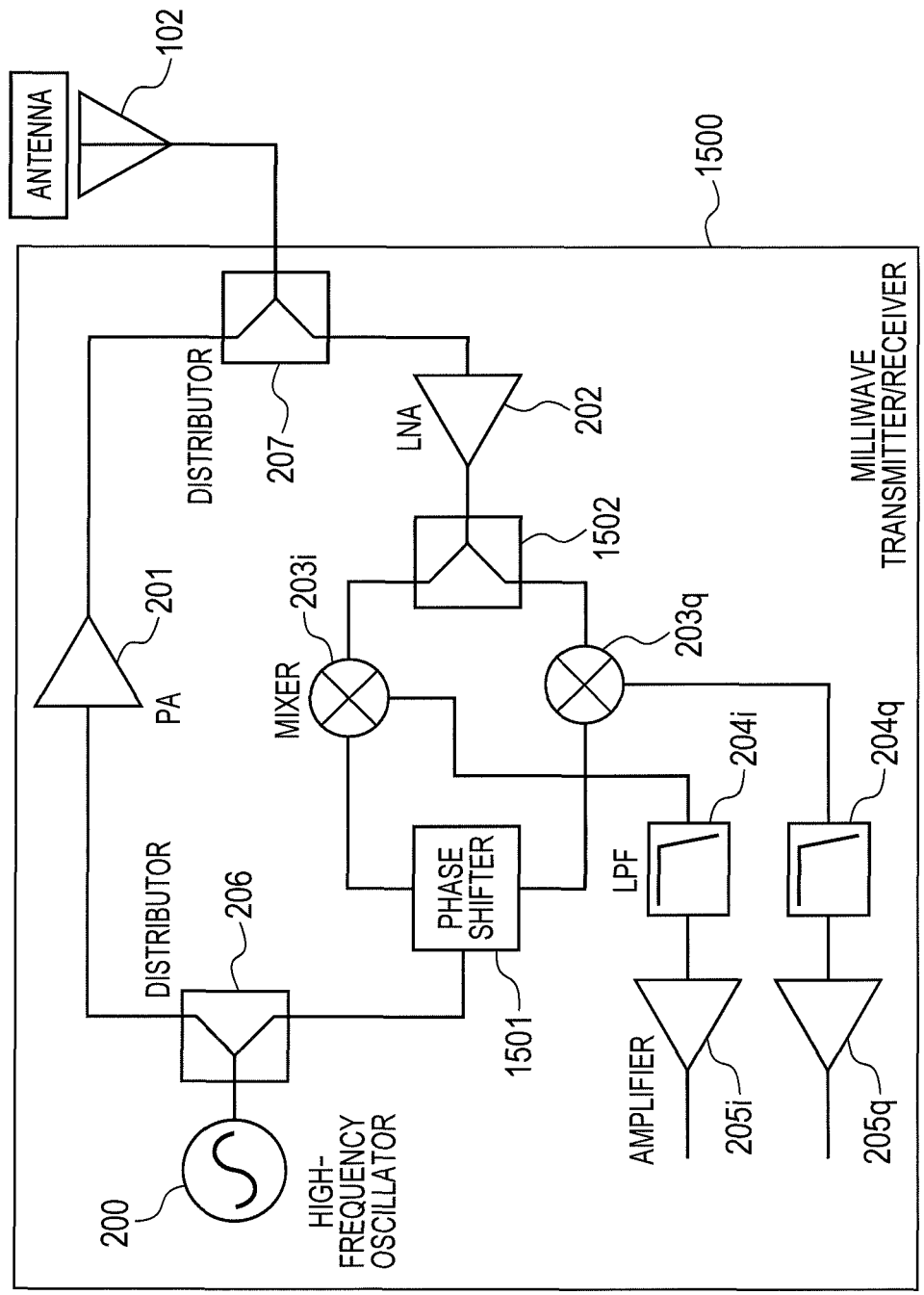
FIG. 15 is a block diagram of a milliwave transmitter/receiver including an orthogonal demodulator according to the present invention.
Figure 16:
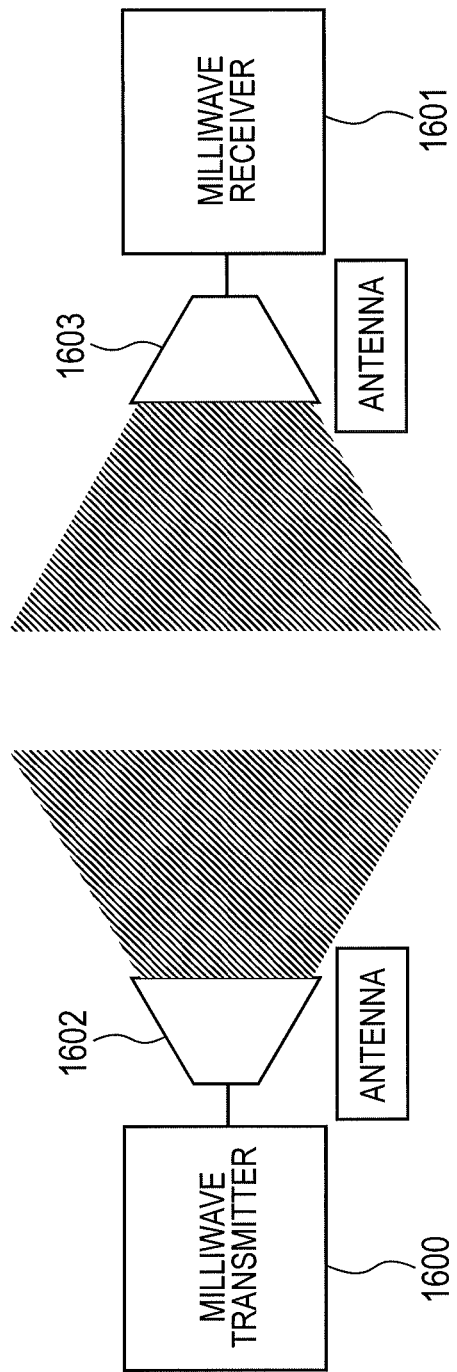
FIG. 16 is a block diagram of a conventional measurement device that utilizes a milliwave.

In the embodiments that have been described so far, the milliwave transmitter/receiver 101 that uses a direct conversion scheme is used for illustration, but the milliwave transmitter/receiver 101 can uses schemes other than the direct conversion scheme. For example, an intermediate frequency output from a milliwave transmitter/receiver that uses a superheterodyne scheme can be used for detecting a signal. Alternatively, an orthogonal demodulator that deals with a signal by dividing the signal into an I (in-phase) component and a Q (quadrature-phase) component can be also used. FIG. 15 shows a block diagram of a milliwave transmitter/receiver 1500 that performs orthogonal demodulation according to the present invention. The milliwave transmitter/receiver 1500 includes a high-frequency oscillator 200, a transmission power amplifier (PA) 201, a reception low-noise amplifier (LNA) 202, mixers 203$i$ and 203$q$, low-pass filters (LPFs) 204$i$ and 204$q$, amplifiers 205$i$ and 205$q$, a 90° phase shifter 1501, and distributers 206, 207, and 1502. Here, subscripts i and q respectively means an I component and a Q component, and hereinafter these subscripts will be omitted when they are not indispensable.

A milliwave signal generated by the high-frequency oscillator 200 is amplified by the transmission power amplifier 201 and output to the antenna 102. In addition, a signal received by the antenna 102 passes through the distributor 207, and is amplified by the LNA 202. Subsequently, the signal is led into two routes and divided into an I component and a Q component by the distributor 1502. The output of the high-frequency oscillator 200 is divided into two local oscillation signals orthogonal to each other by the 90° phase shifter 1501. The two local oscillation signals are respectively multiplied by the received milliwaves by the mixers 203$i$ and 203$q$, and down-converted. Subsequently, the down-converted I and Q components are filtered by the LPFs 204, amplified by the amplifiers 205, and output. The controller obtains a signal intensity by respectively squaring the I and Q components and adding these square values. In other words, the controller down-converts a milliwave received by the receiver by multiplying the milliwave by two kinds of outgoing signals orthogonal to each other, and calculates the sum of the intensities of two kinds of obtained signals.

As described above, by using an orthogonal demodulator that deal with a signal by dividing the signal into an I component and a Q component, a signal intensity independent of the phase of the signal itself can be obtained.

LIST OF REFERENCE SIGNS 100, 500, 800, 1100, 1300 . . . Controller
101, 1500 . . . Milliwave Transmitter/Receiver
102 . . . Antenna
103, 801, 1101$a$, 1101$b$, 1101$c$, . . . , 1301 . . . Vibration Generator
104 . . . Measured Object
105 . . . Central Processing Unit (CPU)
106 . . . Memory
107 . . . I/O Interface (IO)
108, 108$a$, 108$b$, 108$c$, . . . , 1302 . . . Vibrating Surface
109 . . . Driver
110 . . . Vibrator
200 . . . High-frequency Oscillator
201 . . . Power Amplifier (PA)
202 . . . Low-noise Amplifier (LNA)
203 . . . Mixer
204 . . . Low-pass Filter (LPF)
205 . . . Amplifier
206, 207, 1502 . . . Distributor
501 . . . Carrier
502 . . . Container
503 . . . Liquid
802 . . . Switch
1303 . . . End Face
1501 . . . Phase Shifter
1600 . . . Milliwave Transmitter
1601 . . . Milliwave Receiver
1602, 1603 . . . Antenna

The invention claimed is:

1. A measurement device comprising:
a transmitter that transmits radio waves;
a vibrating surface that vibrates physically;
a receiver that receives radio waves; and
a controller that controls outputting of information about a measured object on the pathway between the transmitter and the receiver with the vibrating surface therebetween, based on the radio waves transmitted from the transmitter, reflected by the vibrating surface, and received by the receiver; wherein
the receiver extracts a modulated signal component from the radio waves transmitted from the transmitter and modulated by the vibration of the vibrating surface;
the receiver extracts the signal component modulated by the vibration of the vibrating surface through multiplying the radio waves received by the receiver by an oscillator signal that oscillates at the same frequency as the frequency of the radio waves transmitted by the transmitter; and
the receiver down-converts the radio waves through multiplying the radio waves by two kinds of oscillator signals whose phases are orthogonal to each other, and calculates the sum of the intensities of obtained two kinds of signals.

2. A measurement device comprising:
a transmitter that transmits radio waves;
a vibrating surface that vibrates physically;
a receiver that receives radio waves; and a controller that controls outputting of information about a measured object on the pathway between the transmitter and the receiver with the vibrating surface therebetween, based on the radio waves transmitted from the transmitter, reflected by the vibrating surface, and received by the receiver; wherein the receiver extracts a modulated signal component from the radio waves transmitted from the transmitter and modulated by the vibration of the vibrating surface;

the receiver extracts the signal component modulated by the vibration of the vibrating surface through multiplying the radio waves received by the receiver by an oscillator signal that oscillates at the same frequency as the frequency of the radio waves transmitted by the transmitter;

the transmitter and the receiver are integrated in an all-in-one structure as a transceiver;

the transceiver generates a radio wave transmitted by the transmitter on the basis of the output signal of the high-frequency oscillator, and multiplies the radio wave received by the receiver by the output signal of the high-frequency oscillator; and the receiver performs synchronous detection on an output signal obtained through multiplying the radio waves received by the receiver by the output signal of the high-frequency oscillator with the use of an oscillator signal whose frequency equal to the vibration frequency of the vibrating surface.

3. A measurement device comprising:
a transmitter that transmits radio waves;
a vibrating surface that vibrates physically;
a receiver that receives radio waves;
a controller that controls outputting of information about a measured object on the pathway between the transmitter and the receiver with the vibrating surface therebetween, based on the radio waves transmitted from the transmitter, reflected by the vibrating surface, and received by the receiver; and
a carrier that changes the positional relation between the pathway and the measured object in a direction perpendicular to the pathway, wherein
the receiver extracts a modulated signal component from the radio waves transmitted from the transmitter and modulated by the vibration of the vibrating surface; and
the controller controls the carrier to change the positional relation between the pathway and the measured object in the direction perpendicular to the pathway, and the receiver extracts the intensity of the modulated signal component.

4. The measurement device according to claim 3, wherein the measured object is a container containing a liquid, and the receiver detects the position of the liquid level of the liquid with the use of the intensity of the signal component.

5. The measurement device according to claim 3, wherein the vibrating surface is a curved surface, and the pathway includes the end face of the measured object that reflects the radio waves.

6. A measurement device comprising:
a transmitter that transmits radio waves;
a vibrating surface that vibrates physically;
a receiver that receives radio waves;
a controller that controls outputting of information about a measured object on the pathway between the transmitter and the receiver with the vibrating surface therebetween, based on the radio waves transmitted from the transmitter, reflected by the vibrating surface, and received by the receiver; and a plurality of vibrating surfaces, wherein
the controller switches vibrating surfaces to be vibrated among the plurality of vibrating surfaces by means of a control signal, and
the receiver receives radio waves respectively reflected by the vibrating surfaces to be vibrated among the plurality of vibrating surfaces, and outputs information about the measured object on the basis of the received radio waves.

7. A measurement device comprising:
a transmitter that transmits radio waves;
a vibrating surface that vibrates physically;
a receiver that receives radio waves;
a controller that controls outputting of information about a measured object on the pathway between the transmitter and the receiver with the vibrating surface therebetween, based on the radio waves transmitted from the transmitter, reflected by the vibrating surface, and received by the receiver; and
a plurality of vibrating surfaces, wherein
the controller vibrates the plurality of vibrating surfaces with different frequencies respectively, and
the receiver receives radio waves respectively modulated by the different frequencies, and outputs information about the measured object on the basis of the received radio waves.

8. The measurement device according to claim 7, wherein the information is information about the presence or absence, the position, the size, the liquid volume, or the height of the liquid level of an object.

9. A measurement device comprising:
a transmitter that transmits radio waves;
a vibration generator that generates vibrations vibrating at a vibration frequency;
a receiver that receives radio waves that propagate along a pathway via the vibration generator and extracts the signal intensity of a frequency component whose frequency is equal to the vibration frequency of the vibration generator; and
a carrier that carries a measured object, and changes the positional relation between the pathway and the measured object in the direction perpendicular to the pathway.

10. The measurement device according to claim 9, wherein the vibration generator includes a plurality of vibration sources, and a switch that controls timings for generating the vibrations of the vibration sources.

11. The measurement device according to claim 9, wherein the vibration generator includes a plurality of vibration sources that have different frequencies respectively.

12. The measurement device according to claim 9, wherein the receiver detects an interference wave between a first radio wave that propagates along a first pathway on which a radio wave is reflected by the vibration generator and is not reflected by a measured object and a second radio wave that propagates along a second pathway on which a radio wave is reflected by the vibration generator and by the measured object.

13. The measurement device according to claim 9, wherein the receiver outputs any of the presence or absence, the position, the size, the liquid volume, and the height of the liquid level of a detected object on the pathway.

14. The measurement device according to claim 9, wherein the radio waves are milliwaves or microwaves.

15. The measurement device according to claim 9, wherein the radio waves have frequencies of 1 GHz to 300 GHz.

* * * * *